(12) United States Patent
Thompson

(10) Patent No.: US 12,362,700 B1
(45) Date of Patent: Jul. 15, 2025

(54) TOWER MOUNTED SOLAR APPARATUS AND METHOD

(71) Applicant: Patricia Jean Thompson, Houston, TX (US)

(72) Inventor: Patricia Jean Thompson, Houston, TX (US)

( * ) Notice: Subject to any disclaimer, the term of this patent is extended or adjusted under 35 U.S.C. 154(b) by 0 days.

(21) Appl. No.: 18/736,516

(22) Filed: Jun. 6, 2024

(51) Int. Cl.
*H02S 20/30* (2014.01)

(52) U.S. Cl.
CPC .................................... *H02S 20/30* (2014.12)

(58) Field of Classification Search
None
See application file for complete search history.

(56) References Cited

U.S. PATENT DOCUMENTS 12,308,788 B1 * 5/2025 Alnajjar .................. H02S 20/32

* cited by examiner

*Primary Examiner* — Daniel P Malley, Jr.
(74) *Attorney, Agent, or Firm* — Darryl Edwin Scott

(57) ABSTRACT

An apparatus having a platform, a support beam, hinge point, and first rail. A first rod coupled to a first track. A first actuator coupled to the first rod. A first extender coupled to the first track. A first solar panel coupled to the hinge point and first extender. A second rail coupled to the support beam. A second rod coupled to the second track. A second actuator coupled to the second rod. A second extender coupled to the second track. A second solar panel coupled to the hinge point and second extender. A third rail coupled to the support beam. The third rail has a third track, a third rod coupled to the third track, and a third actuator coupled to the third rod. A third extender coupled to the third track, and a solar panel coupled to the hinge point and coupled to the third extender.

20 Claims, 6 Drawing Sheets

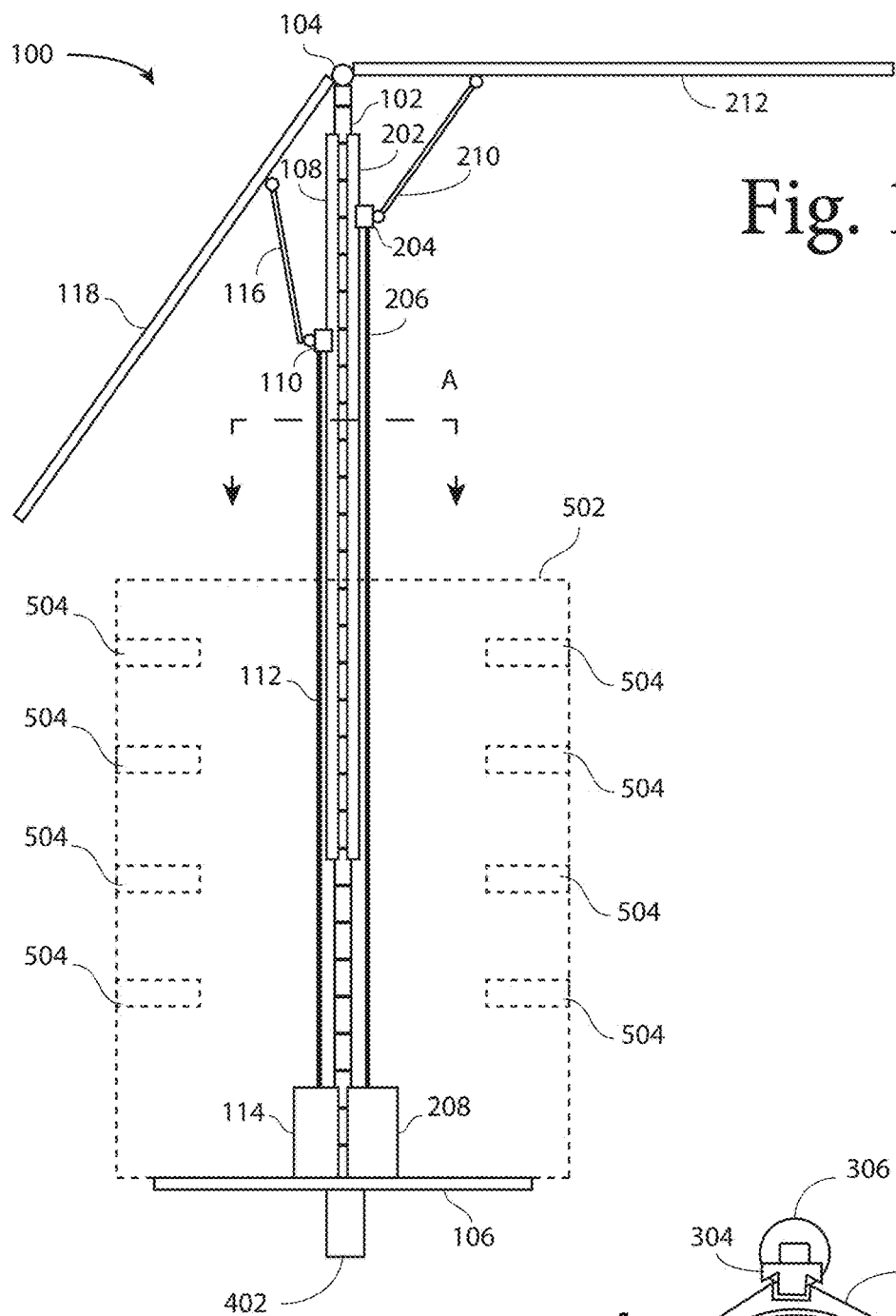
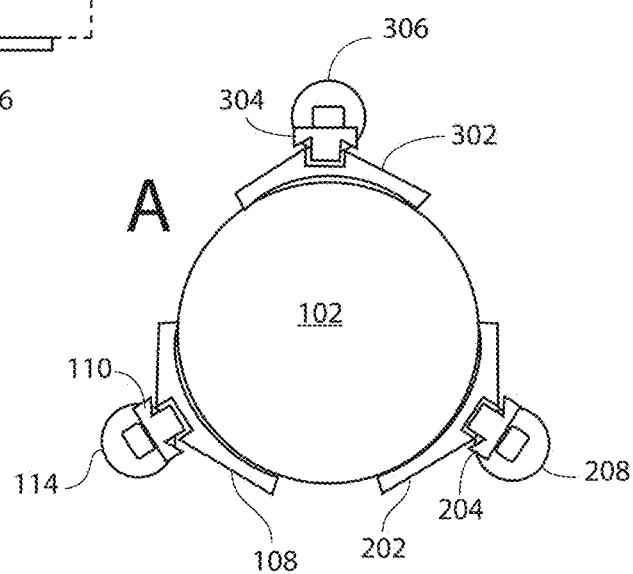
Fig. 1
Fig. 2

TOWER MOUNTED SOLAR APPARATUS AND METHOD

BACKGROUND

Generating power has been a pinnacle in human innovation. Generating power from steam, fire, water, chemical reactions, and particularly fossil fuel has catapulted humankind into a technological revolution. Conversely, creating these innovative power sources has also produced detrimental events. For example, human dependency on fossil fuel arguably has affected the earth and many scholars believe that earth is becoming warmer resulting in catastrophic weather events. Notwithstanding the viability of this principle, many have taken the challenge of mitigating the need for fossil fuel dependency by creating energy through solar panels generated by the sun. Although attempts are constructive in negating the need for fossil fuel dependency, this innovation does not resolve the issue of protecting these power capturing and generating devices from catastrophic storms. Creating and protecting power sources from catastrophic storms is a challenge.

BRIEF DESCRIPTION OF THE DRAWINGS

FIG. 1 is a schematic profile view of a solar energy capturing device having a protective shroud covering.

FIG. 2 is a schematic cross-sectional aerial view of FIG. 1 displaying the solar energy device's detracting and retracting components.

DETAILED DESCRIPTION

Figure 3:
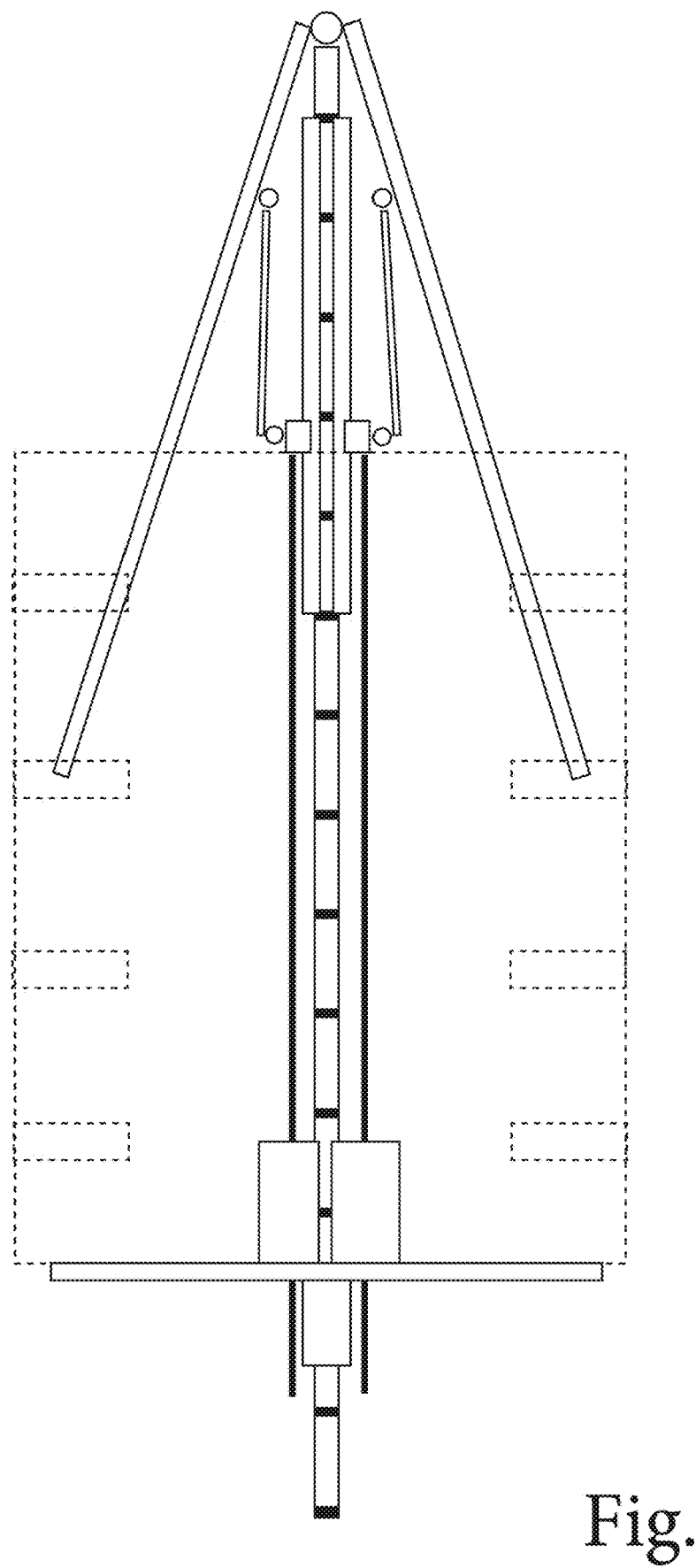
FIG. 3 is a schematic profile view of a solar energy capturing device fully retracted and partially encased by a protective shroud.

The following detailed description illustrates embodiments of the present disclosure. These embodiments are described in sufficient detail to enable a person of ordinary skill in the art to practice these embodiments without undue experimentation. It should be understood, however, that the embodiments and examples described herein are given by way of illustration only, and not by way of limitation. Various substitutions, modifications, additions, and rearrangements may be made that remain potential applications of the disclosed techniques. Therefore, the description that follows is not to be taken as limiting on the scope of the appended claims. In particular, an element associated with a particular embodiment should not be limited to association with that particular embodiment but should be assumed to be capable of association with any embodiment discussed herein. Further, the term "substantially" as used in this disclosure and claims is defined as having a measurement that may be 1, 5, or 10 degrees off from the claimed measurement. For example, when a statement is made that a first embodiment is substantially perpendicular to a second embodiment, this means that the first embodiment may not be perfectly perpendicular (i.e., exactly 90 degrees) to the second embodiment, but within the range of one to ten degrees offset of the 90 degrees (i.e., between 100 degrees or 80 degrees offset).

From the earliest points of recorded history, generating power has been a challenging endeavor in human development. Many attempts have been made to create power by using the heat created by steam or fire, force created by water, expansion and pressure created by chemical reactions. Such innovations have catapulted humankind into a technological revolution that has resulted in innovations such as combustible engines and artificial intelligence operated computer systems.

However, creating such innovative power sources has caused other unforeseeable issues. For example, human dependency on fossil fuel arguably has affected the earth and many scholars believe the earth is becoming warmer resulting in catastrophic weather events. Notwithstanding the viability of this principle, many have taken the challenge of mitigating the need for fossil fuel dependency by creating energy through solar panels generated by the sun. Renewable energy sources, such as solar panels have substantially mitigated the reliance on fossil fuel-which is a depleting energy source. Solar panels are commonly known as devices that converts sunlight into electricity by using photovoltaic cells. These photovoltaic cells are made of materials that produce excited electrons when exposed to light. The electrons flow through a circuit and produce direct current electricity, which can be used to power various devices or be stored in batteries.

Although these attempts at capturing renewable energy are constructive in negating the need for fossil fuel dependency, this innovation does not resolve the issue of protecting these energy capturing devices from catastrophic storms. Since the start of documented weather pattern tracking, scientist have posited that global warming is the cause of the increased severity of storms. These catastrophic storms have caused progressively more damage to infrastructure, such as roads, bridges, homes and buildings. Rebuilding the infrastructure after these severe storms have cost billions of dollars annually.

The embodiments described herein are of a device that alleviates the problem of generating and storing power while surviving the forces of nature. Specifically, the embodiments describe a solar energy capturing device that is retractable and is preserved by a protective covering, such as a shroud. The components of the solar energy capturing device allows for individuals, organizations, or municipalities to capture energy while mitigating potential lost during severe weather events, such as hurricanes, hailstorms, tornadoes, and floods.

For example, FIG. 1 is a schematic profile view of a solar energy capturing device having a protective shroud covering. Specifically, FIG. 1 illustrates a solar energy device 100 for collecting solar energy from the sun for later storage in a battery. The solar energy device 100 is supported by a support beam 102. The support beam 102 is the dominant portion of the structure for holding the solar energy device 100 and all its components. The support beam 102 may be made from a metallic material such as iron, steel, or other similar material. In FIG. 1, the support beam 102 is illustrated as the vertical beam with an array of parallel lines to distinguish it from other elements coupled to the support beam 102. As illustrated in FIG. 1, the support beam 102 may include a hinge point 104 positioned at the apex of the support beam 102. The hinge point 104 is a mechanical bearing that connects two solid objects that allows a limited angle of rotation between the objects. In one or more embodiments, the support beam 102 is supported in the vertical position by a platform 106. The platform 106 operates as the base or foot of the solar energy device 100. The platform 106 is positioned substantially perpendicular to the support beam 102. The support beam 102 may be secured to the platform 106 by bolting, welding, or through other similar coupling methods.

To fully illustrate the mechanical elements of the solar energy device 100, FIG. 2 is a schematic cross-sectional aerial view of FIG. 1 displaying the solar energy device's detracting and retracting components. For example, FIGS. 1 and 2 illustrate a first slide rail 108 coupled to the support beam 102. The first slide rail 108 is a structural barrier that allows wheels or trams to securely roll in a controlled position or direction. Specifically, in one or more embodiments, the first slide rail 108 includes a first track 110 that operates as the mechanism that slides or rolls along the first slide rail 108 in a vertical direction along the support beam 102.

As illustrated in FIG. 1, the first track 110 may be coupled to a first push rod 112 (i.e., illustrated as the solid black line). The first push rod 112 is the mechanism that push or pulls the first track 110 along the first slide rail 108 in a vertical direction along the support beam 102. In one in more embodiments, the solar energy device 100 may include a first actuator 114 coupled to the first push rod 112. The first actuator 114 is the mechanism that uses either mechanical, pneumatic, or hydraulic pressure to push or pull the first push rod 112 in a vertical direction. In one or more embodiments, the first actuator 114 is mounted or coupled to the support beam 102. In another embodiment, the first actuator 114 is coupled or mounted to the platform 106.

As further illustrated in FIG. 1, the solar energy device 100 may include a first arm extender 116 rotatably coupled to the first track 110. That is, the first arm extender 116 is the component that is able to rotate about a limited angle in relation to the first track 110 when the first push rod 112 moves in an ascending or descending direction. In one or more embodiments, the solar energy device 100 includes a first pyramidal-shaped solar panel 118 (note: the shape of the solar panels is more clearly illustrated in FIGS. 5 and 6) that is rotatably coupled to the hinge point 104 and rotatably coupled to the first arm extender 116.

In one or more embodiments, when the first actuator 114 is independently engaged, the first actuator 114 pushes the first push rod 112 in a vertical direction causing the first arm extender 116 to force the first pyramidal-shaped solar panel 118 to rotate about the hinge point 104 into a desired position.

As further illustrated in FIGS. 1 and 2 the solar energy device 100 may include a second slide rail 202 coupled to the support beam 102. Similar to the first slide rail 108, the second slide rail 202 is a structural barrier that allows wheels or trams to securely roll in a controlled position or direction. Specifically, in one or more embodiments, the second slide rail 202 includes a second track 204 that operates as the mechanism that slides or rolls along the second slide rail 202 in a vertical direction along the support beam 102.

As illustrated in FIG. 1, the second track 204 may be coupled to a second push rod 206 (i.e., illustrated as the solid black line). The second push rod 206 is the mechanism that push or pulls the second track 204 along the second slide rail 202 in a vertical direction along the support beam 102. In one in more embodiments, the solar energy device 100 may include a second actuator 208 coupled to the second push rod 206. Similar to the first actuator, the second actuator 208 is the mechanism that uses either mechanical, pneumatic, or hydraulic pressure to push or pull the second push rod 206 in a vertical direction. In one or more embodiments, the second actuator 208 is mounted or coupled to the support beam 102. In another embodiment, the second actuator 208 is coupled or mounted to the platform 106.

As further illustrated in FIG. 1, the solar energy device 100 may include a second arm extender 210 rotatably coupled to the second track 204. That is, the second arm extender 210 is the component that is able to rotate about a limited angle in relation to the second track 204 when the second push rod 206 moves in an ascending or descending direction. In one or more embodiments, the solar energy device 100 includes a second pyramidal-shaped solar panel 212 (note: the shape of the solar panels is more clearly illustrated in FIGS. 5 and 6) that is rotatably coupled to the hinge point 104 and rotatably coupled to the second arm extender 210.

In one or more embodiments, when the second actuator 208 is independently engaged, the second actuator 208 pushes the second push rod 206 in a vertical direction causing the second arm extender 210 to force the second pyramidal-shaped solar panel 212 to rotate about the hinge point 104 into a desired position.

Although not visible in FIG. 1, and partially visible in FIG. 2, the solar energy device 100 has the same mechanical components to move a third pyramidal-shaped solar panel in a desired position. For example, the solar energy device 100 may include a third slide rail 202 coupled to the support beam 102. Similar to the first slide rail 108 and second slide rail 202, the third slide rail 302 is a structural barrier that allows wheels or trams to securely roll in a controlled position or direction. Specifically, in one or more embodiments, the second slide rail 302 includes a third track 304 that operates as the mechanism that slides or rolls along the third slide rail 302 in a vertical direction along the support beam 102.

Although not illustrated for consistency and clarity in the figures, the third track 304 may be coupled to a third push rod (i.e., similar to the first push rod 112 and second push rod 206 illustrated in the solid black lines). The third push rod is the mechanism that push or pulls the third track 304 along the third slide rail 302 in a vertical direction along the support beam 102. In one in more embodiments, the solar energy device 100 may include a third actuator 306 coupled to the third push rod. Similar to the first actuator 114 and second actuator 208, the third actuator 308 is the mechanism that uses either mechanical, pneumatic, or hydraulic pressure to push or pull the third push rod in a vertical direction. In one or more embodiments, the third actuator 306 is mounted or coupled to the support beam 102. In another embodiment, the third actuator 308 is coupled or mounted to the platform 106.

Again, not illustrated for consistency and clarity in the figures, the solar energy device 100 may include a third arm extender rotatably coupled to the third track 304. That is, the third arm extender is the component that is able to rotate about a limited angle in relation to the second track 304 when the third push rod moves in an ascending or descending direction. In one or more embodiments, the solar energy device 100 includes a third pyramidal-shaped solar panel 300 (note: the shape of the solar panels is more clearly illustrated in FIGS. 5 and 6) that is rotatably coupled to the hinge point 104 and rotatably coupled to the third arm extender.

In one or more embodiments, when the third actuator 306 is independently engaged, the third actuator 306 pushes the third push rod in a vertical direction causing the third arm extender to force the third pyramidal-shaped solar panel to rotate about the hinge point 104 into a desired position.

In one or more embodiments, the support beam 102 is mechanically coupled to the platform 106 such that the support beam 102 is capable of extending through a hole or opening in the platform 106. That is, a fourth actuator 402 is coupled to the support beam 102 so that the fourth actuator is able to push or pull the support beam 102 through the platform 106 in a vertical direction. This feature is more clearly illustrated in FIGS. 3 and 5. The fourth actuator 402 allows the solar energy device 100 to descend (i.e., disengage) the solar panels into a protective shroud 502. The protective shroud 502 is illustrated in dash lines for clarity of the internal components. Conversely, when the fourth actuator is engaged, the first, second and third solar panels egress from the shroud 502. The shroud 502 is an enclosure that protects the solar panels from environment damage such as high winds, hail, or other similar natural disasters. In addition, the protective shroud 502 may have vents 504, to allow wind to pass through, thus mitigating potential high-wind damage.

Figure 4:
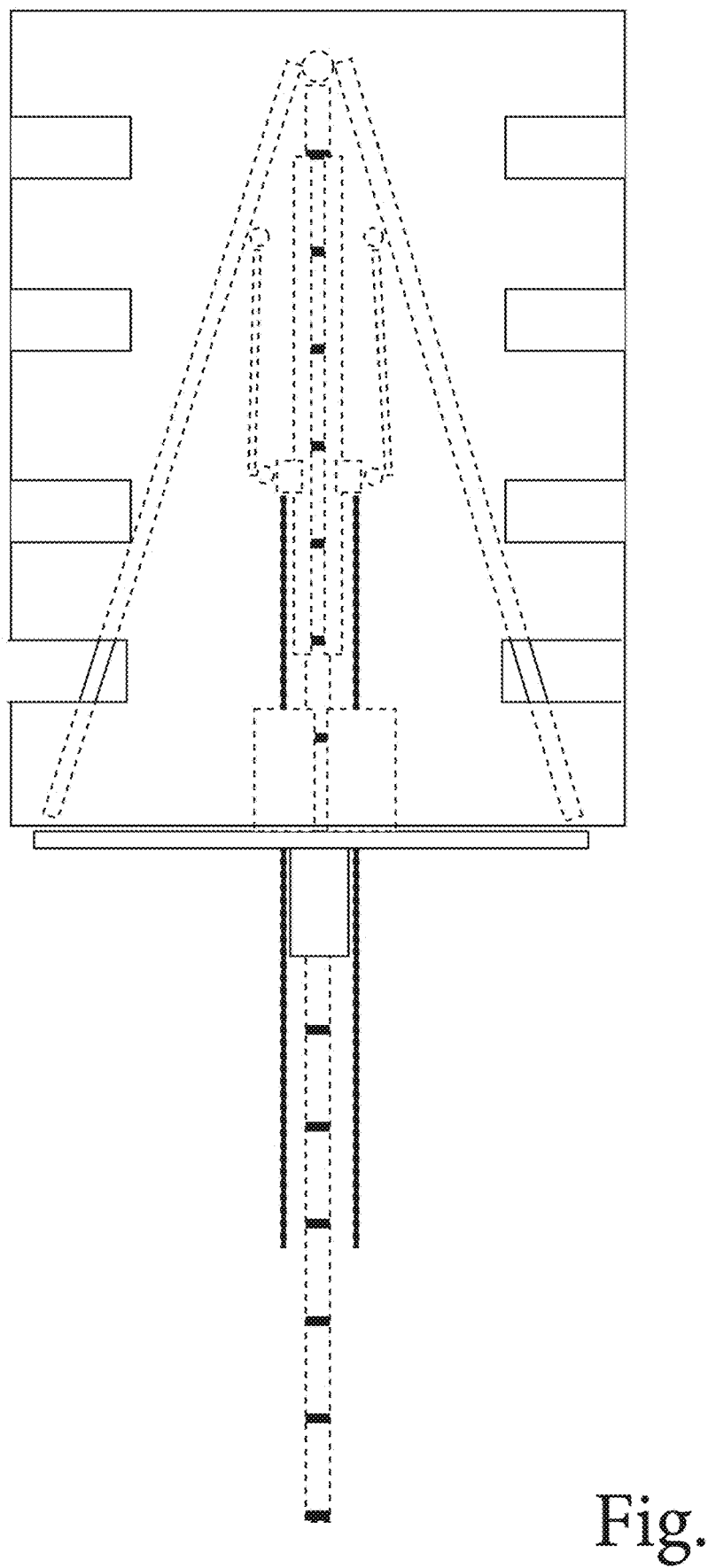
FIG. 4 is a schematic profile view of a solar energy capturing device fully retracted and fully retracted and fully encased by a protective shroud.

The illustration of how the panels egress or descend into the shroud are illustrated in FIGS. 3-4. For example, FIG. 3 is a schematic profile view of a solar energy capturing device fully retracted and partially encased by a protective shroud. FIG. 4 is a schematic profile view of a solar energy capturing device fully retracted and fully retracted and fully encased by a protective shroud. When reviewing the figures starting with FIG. 1 and ending with FIG. 3, the solar energy device 100 begins in a fully egressed state (i.e., engaged and capturing solar energy from the sun) and ends with the solar energy device 100 in a retracted state (i.e., fully protected and enclosed in the shroud 502). Note, the shroud 502 is illustrated as translucent for clarity.

Figure 6:
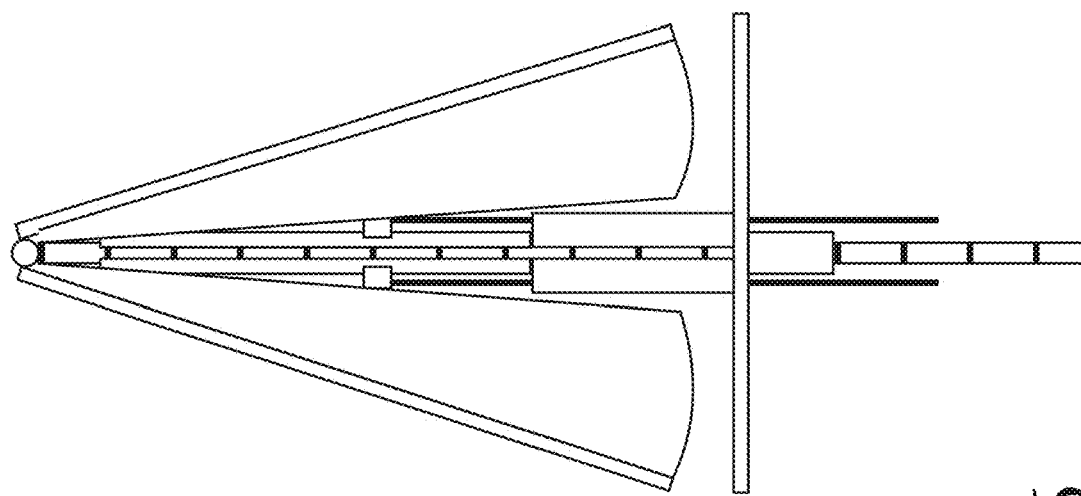
FIG. 6 is a schematic profile view of a solar energy capturing device fully retracted displaying the solar panels in a retracted and folded position.
Figure 5:
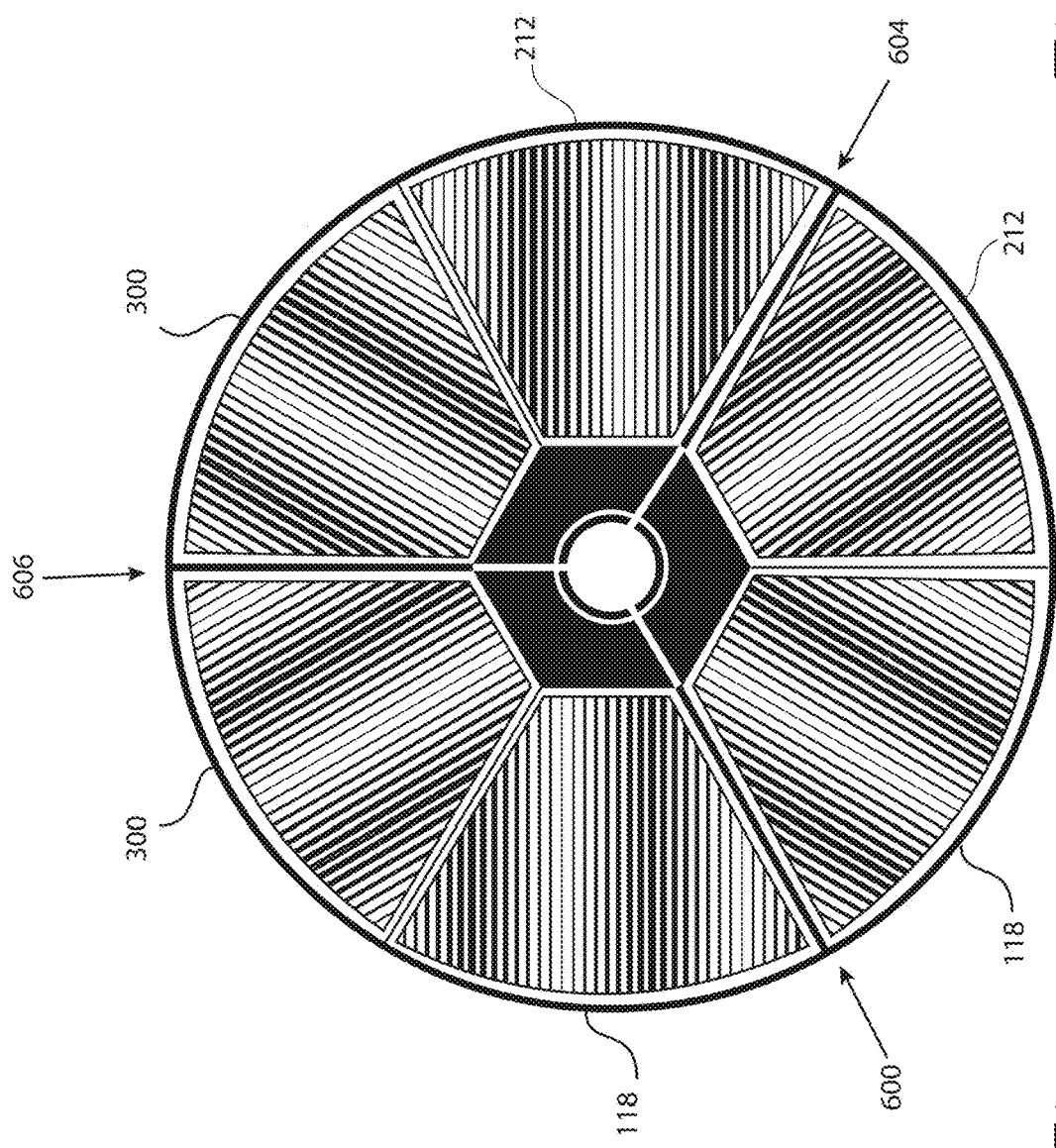
FIG. 5 is a schematic aerial view of the fully expanded solar energy capturing device for capturing solar energy.

An aerial view of the solar energy device 100 is depicted in FIG. 5. Here, the pyramidal-shaped solar panel is depicted more clearly. As described above, the solar energy device 100 has three independent pyramidal-shaped solar panels. Each solar panel has two wings that are foldable along an axis point. For example, the first pyramidal-shaped solar panel 118 may be folded along axis point 602. The second pyramidal-shaped solar panel 212 may be folded along axis point 604, and the third pyramidal-shaped solar panel 300 may be folded along axis point 606. FIG. 6 is a schematic profile view of a solar energy capturing device fully retracted displaying the solar panels in a retracted and folded position. Specifically, FIG. 6 illustrates two of the panels in a folded position that allows for the solar panels to be fully enclosed in the protective shroud 502. Moreover, the folding of the panels allows for the panels to egress and descend without independently damaging the other solar panels.

Figure 7:
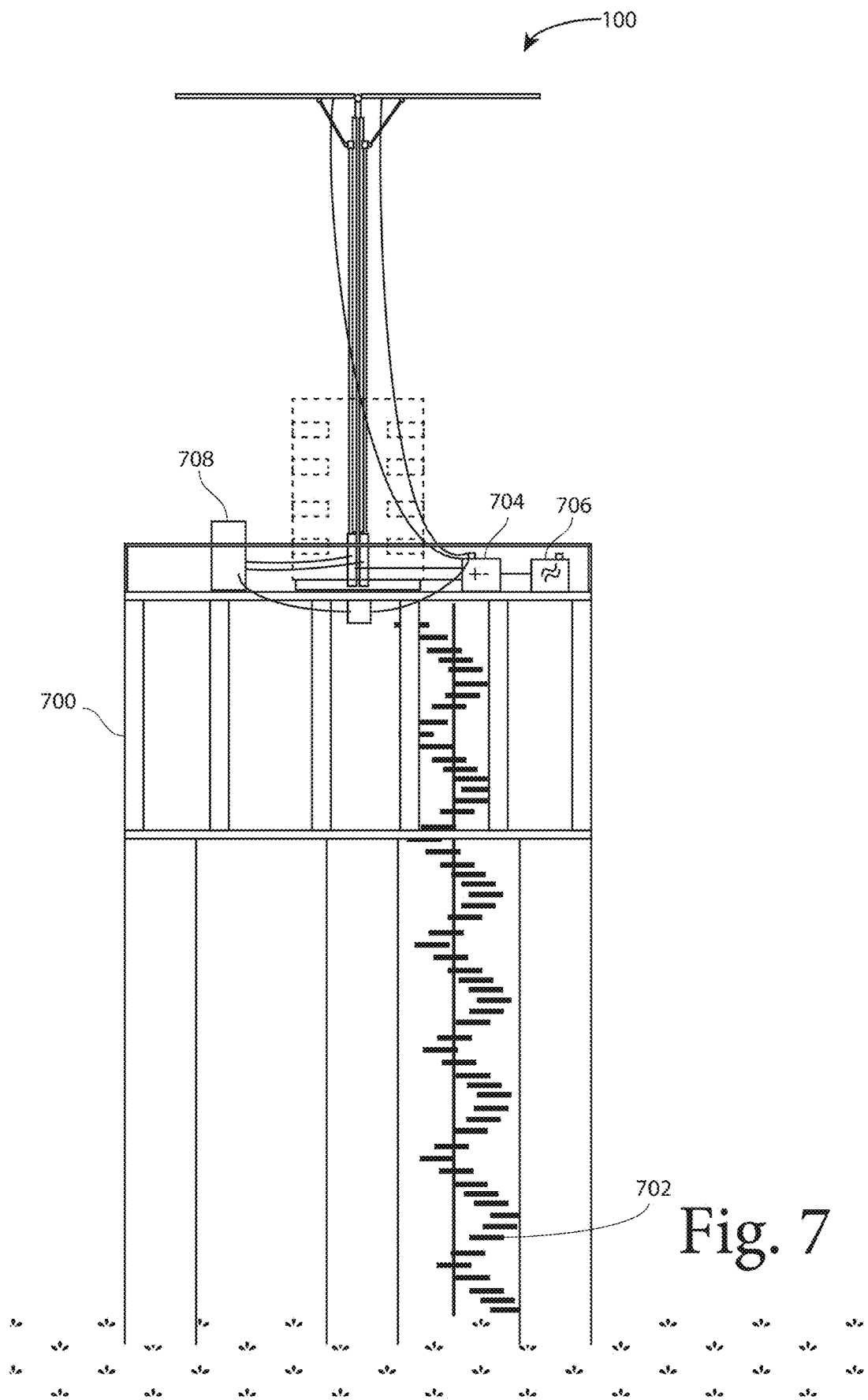
FIG. 7 is a schematic profile view of a multi-leveled tower supporting a solar energy capturing device wherein the solar panels are in an expanded position.
Figure 8:
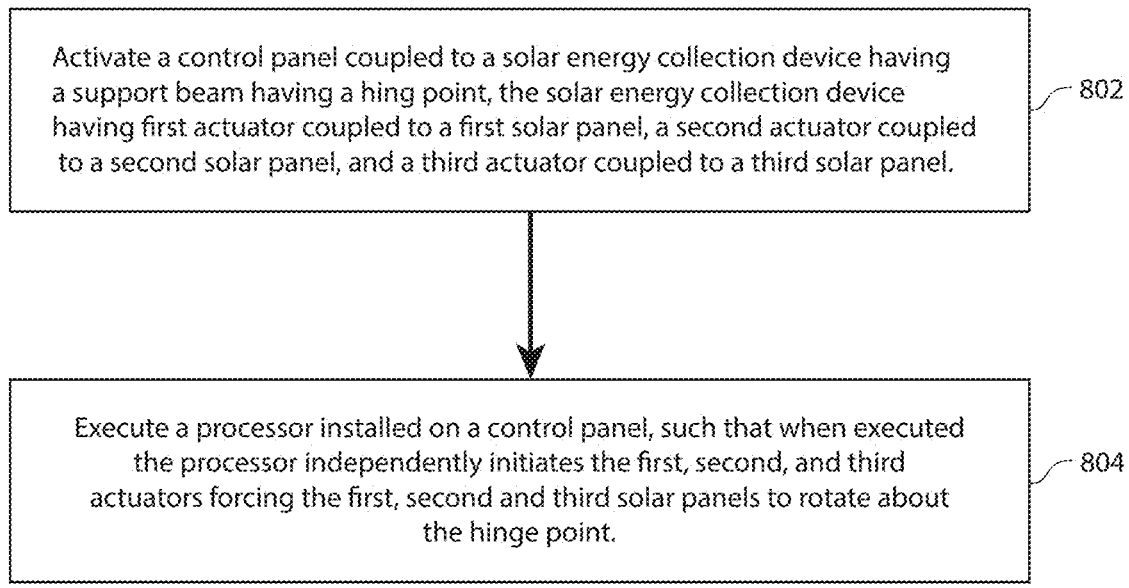
FIG. 8 is a flow chart of the method of initiating a solar energy capturing device.

To fully protect the solar energy device 100 from other catastrophic storms, such as flooding, FIG. 7 is a schematic profile view of a multi-leveled tower supporting a solar energy capturing device wherein the solar panels are in an expanded position. As illustrated in FIG. 7, the solar energy device 100 may be placed on a tower structure 700 having at least two floor levels for service and maintenance needs. A stairwell 702 is coupled to the tower structure 700 for access to the solar energy device 100. In one or more embodiments, the first, second, and third panels are electronically coupled to a rechargeable battery 704. The rechargeable battery 704 is the power storage device collected from the solar panels. In addition, the first, second, third, and fourth actuators may be electronically coupled to the rechargeable battery 704. In one or more embodiments, the rechargeable battery 704 may be electronically coupled to a power inverter 706. The power inverter 706 is a device that converts direct current electricity from a source, such as the rechargeable battery 704, into alternating current. As further illustrated in FIG. 7, the solar energy device 100 may be operated remotely through wireless or cloud technology and locally by a control panel 708 having a processor. The control panel 708 may be accessed by an operator to manually operate the solar panel device 100 or alternatively execute the internal processor that runs a program to operate independently such as through machine learning technology. In addition, the control panel 708 may be coupled to the first, second, third and fourth actuator. In one or more embodiments, the rechargeable battery 704, the power invert 706, and the control panel 708 is protected by a panel, a shroud, or other similar protective barrier that mitigates potential damage from torrential weather events.

In operation, a control panel (such as control panel 708) coupled to a solar energy collection device (such as solar energy device 100) having a support beam (such as support beam 102) having a hinge point (such as hinge point 104), the solar energy collection device (such as solar energy device 100) having a first actuator (such as first actuator 114) coupled to a first solar panel (such as first pyramidal-shaped solar panel 118), a second actuator (such as second actuator 208) coupled to a second solar panel (such as second pyramidal-shaped solar panel 212), and a third actuator (such as third actuator 306) coupled to a third solar panel (such as third pyramidal-shaped solar panel 300) is activated. (block 802).

A processor installed on a control panel (such as control panel 708) is executed, such that when executed the processor independently initiates the first, second, and third actuators (such as first actuator, 114, second actuator 208, and third actuator 306) forcing the first, second, and third solar panels (such as first pyramidal-shaped solar panel 118, second pyramidal-shaped solar panel 212, and third pyramidal-shaped solar panel 300) to rotate about hinge point (such as hinge point 104) (block 804).

In one aspect, the apparatus for collecting solar energy includes a platform having a support beam positioned substantially perpendicular to the platform. The support beam has a hinge point. A first slide rail is coupled to the support beam. The first slide rail has a first track, a first push rod coupled to the first track, and a first actuator coupled to the first push rod. A first arm extender is rotatably coupled to the first track. A first pyramidal-shaped solar panel is rotatably coupled to the hinge point. The first pyramidal-shaped solar panel is rotatably coupled to the first arm extender. A second slide rail is coupled to the support bream. The second slide rail has a second track, a second push rod coupled to the second track, and a second actuator coupled to the second push rod. A second arm extender is rotatably coupled to the second track. A second pyramidal-shaped solar panel is rotatably coupled to the hinge point. The second pyramidal-shaped solar panel is rotatably coupled the second arm extender. A third slide rail is coupled to the support beam. The third slide rail has a third track, a third push rod coupled to the third track, and a third actuator coupled to the third push rod. A third arm extender is rotatably coupled to the third track. A third pyramidal-shaped solar panel is rotatably coupled to the hinge point. The third pyramidal-shaped solar panel is rotatably coupled to the third arm extender, such that when the first, second, and third actuators are independently engaged, the first, second, and third solar panels are rotated about the hinge point.

Implementation may include one or more of the following. A fourth actuator may be coupled to the support beam. A shroud may be coupled to the platform such that when the support beam is engaged, the first, second, and third solar panels egress from the shroud. The shroud may have ventilation ports. The first, second and third solar panels may be electronically coupled to a rechargeable battery. The first, second, and third actuators may be electronically coupled to the rechargeable battery. The rechargeable battery may be coupled to a power inverter. The first, second, and third actuators may be pneumatic. The actuators may be coupled to the control panel having a processor.

In one aspect, a system for collecting solar energy includes a tower structure having at least two floor levels and a stairwell coupled to the tower structure. A platform having a support beam positioned substantially perpendicular to the platform. The support beam has a hinge point. A first slide rail is coupled to the support beam. The first slide rail has a first track, a first push rod coupled to the first track, and a first actuator coupled to the first push rod. A first arm extender is rotatably coupled to the first track. A first pyramidal-shaped solar panel is rotatably coupled to the hinge point. The first pyramidal-shaped solar panel is rotatably coupled to the first arm extender. A second slide rail is coupled to the support bream. The second slide rail has a second track, a second push rod coupled to the second track, and a second actuator coupled to the second push rod. A second arm extender is rotatably coupled to the second track. A second pyramidal-shaped solar panel is rotatably coupled to the hinge point. The second pyramidal-shaped solar panel is rotatably coupled the second arm extender. A third slide rail is coupled to the support beam. The third slide rail has a third track, a third push rod coupled to the third track, and a third actuator coupled to the third push rod. A third arm extender is rotatably coupled to the third track. A third pyramidal-shaped solar panel is rotatably coupled to the hinge point. The third pyramidal-shaped solar panel is rotatably coupled to the third arm extender, such that when the first, second, and third actuators are independently engaged, the first, second, and third solar panels are rotated about the hinge point.

Implementation may include one or more of the following. A fourth actuator may be coupled to the support beam. A shroud may be coupled to the platform such that when the support beam is engaged, the first, second, and third solar panels egress from the shroud. The shroud may have ventilation ports. The first, second and third solar panels may be electronically coupled to a rechargeable battery. The first, second, and third actuators may be electronically coupled to the rechargeable battery. The rechargeable battery may be coupled to a power inverter. The first, second, and third actuators may be pneumatic. The actuators may be coupled to the control panel having a processor.

In one aspect, the method includes activating a control panel coupled to a solar energy collection device, the solar energy collection device has a platform. The platform has a support beam positioned substantially perpendicular to the platform. The support beam has a hinge point. A first slide rail is coupled to the support beam. The first slide rail has a first track, a first push rod coupled to the first track, and a first actuator coupled to the first push rod. A first arm extender is rotatably coupled to the first track. A first pyramidal-shaped solar panel is rotatably coupled to the hinge point. The first pyramidal-shaped solar panel is rotatably coupled to the first arm extender. A second slide rail is coupled to the support bream. The second slide rail has a second track, a second push rod coupled to the second track, and a second actuator coupled to the second push rod. A second arm extender is rotatably coupled to the second track. A second pyramidal-shaped solar panel is rotatably coupled to the hinge point. The second pyramidal-shaped solar panel is rotatably coupled the second arm extender. A third slide rail is coupled to the support beam. The third slide rail has a third track, a third push rod coupled to the third track, and a third actuator coupled to the third push rod. A third arm extender is rotatably coupled to the third track. A third pyramidal-shaped solar panel is rotatably coupled to the hinge point. The third pyramidal-shaped solar panel is rotatably coupled to the third arm extender, such that when the first, second, and third actuators are independently engaged, the first, second, and third solar panels are rotated about the hinge point. A processor installed on the control panel is executed, such that when executed the processor independently initiates the first, second, and third actuators forcing the first, second, and third solar panels to rotate about the hinge point.

Implementation may include one or more of the following. A fourth actuator may be coupled to the support beam. A shroud may be coupled to the platform such that when the support beam is engaged, the first, second, and third solar panels egress from the shroud. The shroud may have ventilation ports. The first, second and third solar panels may be electronically coupled to a rechargeable battery. The first, second, and third actuators may be electronically coupled to the rechargeable battery. The rechargeable battery may be coupled to a power inverter. The first, second, and third actuators may be pneumatic. The actuators may be coupled to the control panel having a processor.

The operations of the flow diagrams are described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

The word "coupled" herein means a direct connection or an indirect connection.

The text above describes one or more specific embodiments of a broader invention. The invention also is carried out in a variety of alternate embodiments and thus is not limited to those described here. The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:
1. An apparatus for collecting solar energy comprising:
   a platform having a support beam positioned substantially perpendicular to the platform, the support beam having a hinge point;
   a first slide rail coupled to the support beam, the first slide rail having:
      a first track;
      a first push rod coupled to the first track; and
      a first actuator coupled to the first push rod;

a first arm extender rotatably coupled to the first track; and
a first pyramidal-shaped solar panel rotatably coupled to the hinge point and rotatably coupled to the first arm extender;
a second slide rail coupled to the support beam, the second slide rail having:
a second track;
a second push rod coupled to the second track; and
a second actuator coupled to the second push rod;
a second arm extender rotatably coupled to the second track;
a second pyramidal-shaped solar panel rotatably coupled to the hinge point and rotatably coupled to the second arm extender;
a third slide rail coupled to the support beam, the third slide rail having:
a third track;
a third push rod coupled to the third track; and
a third actuator coupled to the third push rod;
a third arm extender rotatably coupled to the third track; and
a third pyramidal-shaped solar panel rotatably coupled to the hinge point and rotatably coupled to the third arm extender, such that when the first, second, and third actuators are independently engaged, the first, second, and third solar panels are rotated about the hinge point.

2. The apparatus of claim 1 further comprising:
a fourth actuator coupled to the support beam; and
a shroud coupled to the platform, such that when the support beam is engaged, the first, second, and third solar panels egress from the shroud.

3. The apparatus of claim 2 wherein the shroud has ventilation ports.

4. The apparatus of claim 1 wherein the first, second, and third solar panels are electronically coupled to a rechargeable battery.

5. The apparatus of claim 4 wherein the first, second, and third actuator are electronically coupled to the rechargeable battery.

6. The apparatus of claim 5 wherein the rechargeable battery is coupled to a power inverter.

7. The apparatus of claim 1 wherein the first, second, and third actuators are pneumatic.

8. The apparatus of claim 2 wherein the actuators are electronically coupled to a control panel having processor.

9. A system for collecting solar energy comprising:
a tower structure having at least two floor levels; and
a stairwell coupled to the tower structure;
a solar energy collection device coupled to the tower structure, the solar energy collection device having:
a platform having a support beam positioned substantially perpendicular to the platform, the support beam having an hinge point;
a first slide rail coupled to the support beam, the first slide rail having:
a first track;
a first push rod coupled to the first track; and
a first actuator coupled to the first push rod;
a first arm extender rotatably coupled to the first track; and
a first pyramidal-shaped solar panel rotatably coupled to the hinge point and rotatably coupled to the first arm extender;
a second slide rail coupled to the support beam, the second slide rail having:
a second track;
a second push rod coupled to the second track; and
a second actuator coupled to the second push rod;
a second arm extender rotatably coupled to the second track;
a second pyramidal-shaped solar panel rotatably coupled to the hinge point and rotatably coupled to the second arm extender;
a third slide rail coupled to the support beam, the third slide rail having:
a third track;
a third push rod coupled to the third track; and
a third actuator coupled to the third pushrod;
a third arm extender rotatably coupled to the third track; and
a third pyramidal-shaped solar panel rotatably coupled to the hinge point and rotatably coupled to the third arm extender, such that when the first, second, and third actuators are independently engaged the first, second, and third solar panels are rotated about the hinge point.

10. The system of claim 9 further comprising:
a fourth actuator coupled to the support beam; and
a shroud coupled to the platform, such that when the fourth pushrod is engaged the first, second, and third solar panels egress from the shroud.

11. The system of claim 9 wherein the first, second, and third solar panels are electronically coupled to a rechargeable battery.

12. The system of claim 11 wherein the first, second, and third actuator are electronically coupled to the rechargeable battery.

13. The system of claim 11 wherein the rechargeable battery is coupled to a power inverter.

14. The system of claim 10 wherein the actuators are electronically coupled to a control panel having processor.

15. A method for collecting solar energy comprising:
Activating a control panel coupled to a solar energy collection device, the solar energy collection device having:
a platform having a support beam positioned substantially perpendicular to the platform, the support beam having
a hinge point;
a first slide rail coupled to the support beam, the first slide rail having:
a first track;
a first push rod coupled to the first track; and
a first actuator coupled to the first pushrod;
a first arm extender rotatably coupled to the first track;
a first pyramidal-shaped solar panel rotatably coupled to the hinge point and rotatably coupled to the first arm extender;
a second slide rail coupled to the support beam, the second slide rail having:
a second track;
a second push rod coupled to the second track; and
a second actuator coupled to the second pushrod;
a second arm extender rotatably coupled to the second track;
a second pyramidal-shaped solar panel rotatably coupled to the hinge point and rotatably coupled to the second arm extender; and
a second solar panel slider coupled to second pyramidal-shaped solar panel and rotatably coupled to the second arm extender;
a third slide rail coupled to the support beam, the third slide rail having:

a third track;
a third push rod coupled to the third track;
and a third actuator coupled to the third pushrod;
a third arm extender rotatably coupled to the third track;
a third pyramidal-shaped solar panel rotatably coupled to the hinge point and rotatably coupled to the third arm extender;
executing a processor installed on the control panel, such that when executed the processor independently initiates the first, second, and third actuators forcing the first, second, and third solar panels to rotate about the hinge point.

16. The method of claim 15 further comprising:
a fourth actuator coupled to the support beam; and
a shroud coupled to the platform, such that when the fourth pushrod is engaged the first, second and third solar panels egress from the shroud.

17. The method of claim 14 wherein the first, second, and third solar panels are electronically coupled to a rechargeable battery.

18. The method of claim 17 wherein the first, second, and third actuator are electronically coupled to the rechargeable battery.

19. The method of claim 17 wherein the rechargeable battery is coupled to a power inverter.

20. The method of claim 16 wherein the actuators are electronically coupled to a control panel having processor.

* * * * *